US007966662B2

(12) United States Patent
Rose et al.

(10) Patent No.: US 7,966,662 B2
(45) Date of Patent: Jun. 21, 2011

(54) METHOD AND SYSTEM FOR MANAGING AUTHENTICATION AND PAYMENT FOR USE OF BROADCAST MATERIAL

(75) Inventors: Gregory Gordon Rose, San Diego, CA (US); James Semple, London (GB); Roy Franklin Quick, Jr., San Diego, CA (US); Philip Michael Hawkes, Burwood (AU)

(73) Assignee: QUALCOMM Incorporated, San Diego, CA (US)

( * ) Notice: Subject to any disclaimer, the term of this patent is extended or adjusted under 35 U.S.C. 154(b) by 1419 days.

(21) Appl. No.: 11/031,507

(22) Filed: Jan. 6, 2005

(65) Prior Publication Data
US 2006/0048235 A1 Mar. 2, 2006

Related U.S. Application Data

(60) Provisional application No. 60/607,024, filed on Sep. 2, 2004.

(51) Int. Cl.
*H04L 9/32* (2006.01)
(52) U.S. Cl. ............... 726/26; 726/27; 726/29; 726/30; 726/31; 713/181; 380/270; 380/277; 380/247
(58) Field of Classification Search .................. 326/8; 380/200–242, 247–251, 255–278, 281, 284; 713/150, 168, 171, 176, 180, 182, 194, 181; 725/4, 31, 26; 370/355; 709/223; 705/26; 726/4, 26, 29, 30, 31, 27
See application file for complete search history.

(56) References Cited

U.S. PATENT DOCUMENTS

| | | | |
|---|---|---|---|
| 6,175,922 B1 * | 1/2001 | Wang | 713/182 |
| 6,332,025 B2 * | 12/2001 | Takahashi et al. | 380/281 |
| 6,496,928 B1 * | 12/2002 | Deo et al. | 713/153 |
| 6,915,272 B1 * | 7/2005 | Zilliacus et al. | 705/26 |
| 6,961,858 B2 * | 11/2005 | Fransdonk | 726/29 |
| 6,993,137 B2 * | 1/2006 | Fransdonk | 380/279 |
| 7,136,840 B2 * | 11/2006 | Pinkas et al. | 705/75 |
| 7,149,545 B2 * | 12/2006 | Hurst et al. | 455/558 |
| 7,310,732 B2 * | 12/2007 | Matsuyama et al. | 713/176 |

(Continued)

FOREIGN PATENT DOCUMENTS

EP 1 221 690 A1 7/2002

(Continued)

OTHER PUBLICATIONS

Carol H. Fancher, "In your pockets smartcards," Electronic Payments, IEEE Spectrum, Feb. 1997, Motorola, Inc., pp. 47-53.*

(Continued)

*Primary Examiner* — Brandon S Hoffman
*Assistant Examiner* — Hee Song
(74) *Attorney, Agent, or Firm* — Won Tae Kim

(57) ABSTRACT

An authentication system is disclosed. The authentication system includes a content provider configured to distribute encrypted content, wherein the encrypted content is generated using a content key, and a client having a symmetric key and configured to store the encrypted content received from the content provider and issue a request to the content provider, wherein the request includes a cryptographic function configured to have the symmetric key and the encrypted content as input, wherein the content provider is further configured to verify the client via the request to ensure that the client has received the encrypted content.

27 Claims, 4 Drawing Sheets

U.S. PATENT DOCUMENTS

| | | | | |
|---|---|---|---|---|
| 7,359,375 | B2 * | 4/2008 | Lipsanen et al. | 370/355 |
| 7,506,367 | B1 * | 3/2009 | Ishibashi | 726/10 |
| 7,568,234 | B2 * | 7/2009 | Naslund et al. | 726/26 |
| 2005/0086334 | A1 * | 4/2005 | Aaltonen et al. | 709/223 |

FOREIGN PATENT DOCUMENTS

| | | |
|---|---|---|
| EP | 1 237 323 A1 | 9/2002 |
| EP | 1237323 A1 * | 9/2002 |
| JP | 2004 159036 | 12/2003 |

OTHER PUBLICATIONS

Lue, Q., Safavi-Naini, R. and Sheppard, N. Digital Rights Management for Content Distribution. In Proceedings of the Australasian Information Society Workshop (2003), 49-58.*

FIPS PUB 198, "The Keyed-Hash Message Authentication Code (HMAC)", http://csrc.nist.gov/publications/fips/fips198/fips-198a.pdf, Mar. 6, 2002.*

Thomas S. Messerges, "Digital rights management in a 3G mobile phone and beyond", ACM Workshop on Digital Rights Management, Proceedings of the 3rd ACM workshop on Digital rights management, pp. 27-38, 2003.*

FIPS PUB 198, "The Keyed-Hash Message Authentication Code (HMAC)", http://csrc.nist.gov/publications/fips/fips198/fips-198a.pdf, Mar. 6, 2002.*

Thomas S. Messerges, "Digital Rights Management in a 3G mobile phone and beyond," ACM Workshop on Digital Rights Management, Proceedings of teh 3rd ACM workshop on Digital Rights Management, pp. 27-38, 2003.*

International Search Report—PCT/US05/031451, International Search Authority—European Patent Office—Jan. 16, 2006.

Written Opinion—PCT/US05/031451, International Search Authority—European Patent Office—Jan. 16, 2006.

* cited by examiner

METHOD AND SYSTEM FOR MANAGING AUTHENTICATION AND PAYMENT FOR USE OF BROADCAST MATERIAL

CROSS-REFERENCE TO RELATED APPLICATION

This application claims priority to U.S. Provisional Patent Application Ser. No. 60/607,024, filed Oct. 2, 2004 and which is incorporated herein by reference in its entirety.

BACKGROUND

1. Field

The present disclosure relates generally to broadcast material, and more specifically, to methods and systems for managing authentication and payment for use of broadcast material.

2. Background

In the context of wireless broadcast, there is an advantage to using spare broadcast capacity to distribute non-requested material or content to terminals for storage, even though the user may or may not care about the content at the time of distribution. The terminals may be mobile including, for example, a mobile phone. The content may include a variety of information including, for example, textual information, audio-visual material, games, etc. Typically, the broadcast service provider who distributed the content may restrict its subsequent access.

The broadcast service provider may then make the content stored on a terminal available to a user at a later time, perhaps for a fee in some cases. With the content stored at a terminal, the user may browse the currently available content and then decide whether to have continued access. For example, a user might decide to try out a new game that is currently stored on his/her mobile phone.

The foregoing arrangement allows the user to have efficient access to the content. However, such arrangement also presents a couple of security issues. First, the broadcast service provider needs to ensure that the user is not able to deny having received the content; second, nothing sent by the broadcast service provider to the terminal should enable anyone other than the intended user to access the content. To address these issues, some current solutions rely on the terminal being trustworthy. Given the sophisticated level of security breaches, relying on the trustworthiness of the terminal to protect the integrity of stored content may not be sufficient. In other solutions, a well known cryptographic protocol called "Fair Exchange", or variations thereof, is used to encrypt the broadcast content. This protocol, however, has a number of drawbacks when used in connection with the foregoing arrangement. For example, this protocol requires the involvement of a trusted third party whose role is to provide some objective level of authenticity between two parties; also, the messages generated under this protocol always require some form of digital signatures and/or zero knowledge proofs, which are computationally expensive; and furthermore, this protocol requires the use of asymmetric (public) keys which may not be provisioned into the terminal.

Hence, it would be desirable to provide more efficient methods and systems for managing authentication and payment for use of broadcast material.

SUMMARY

In one embodiment, an authentication system includes a content provider configured to distribute encrypted content, wherein the encrypted content is generated using a content key, and a client having a symmetric key and configured to store the encrypted content received from the content provider and issue a request to the content provider, wherein the request includes a cryptographic function configured to have the symmetric key and the encrypted content as input, wherein the content provider is further configured to verify the client via the request to ensure that the client has received the encrypted content.

In another embodiment, a content broadcast system includes a broadcast service provider configured to generate encrypted content using a content key and distribute the encrypted content, and a client having a symmetric key and configured to store the encrypted content received from the broadcast service provider and issue to the broadcast service provider a request having a cryptographic function configured to have the symmetric key and the encrypted content as input, wherein the broadcast service provider is further configured to verify the client via the request and, in response to successful verification, generate an encrypted content key for the client using the content key and the symmetric key, and wherein the client is further configured to decrypt the encrypted content key to derive the content key that is usable to decrypt the encrypted content.

In yet another embodiment, an authentication system includes a broadcast service provider having means for generating encrypted content using a content key and distributing the encrypted content, and a client having a symmetric key and means for storing the encrypted content received from the broadcast service provider and issuing to the broadcast service provider a request having a cryptographic function configured to have the symmetric key and the encrypted content as input, wherein the broadcast service provider further includes means for verifying the client via the request and means for generating an encrypted content key for the client using the content key and the symmetric key and means for forwarding the encrypted content key to the client, in response to successful verification, and wherein the client further includes means for decrypting the encrypted content key to derive the content key that is usable to decrypt the encrypted content.

In yet a further embodiment, a mobile phone includes a symmetric key, a processor, and control logic executable by the processor and configured to: store encrypted content received from a content provider, issue a request to content provider, wherein the request includes a cryptographic function configured to have the symmetric key and the encrypted content as input, decrypt an encrypted content key received from the content provider in order to derive a content key, wherein the encrypted content key is issued by the content provider in response to the request, and decrypt the encrypted content using the content key.

In one aspect, a method for managing authentication between a content provider and a client is provided. The method includes encrypting content with a content key at the content provider, distributing the encrypted content from the content provider to the client, generating a request at the client, the request having a cryptographic function configured to receive a symmetric key associated with the client and the encrypted content as input, forwarding the request from the client to the content provider, and examining the request at the content provider to verify that the client has received the encrypted content.

In another aspect, a method for distributing content is disclosed. The method includes distributing encrypted content from a content provider to a client, wherein the encrypted content is generated by the content provider using a content key, forwarding a request from the client to the content provider, the request having a cryptographic function configured to receive a symmetric key associated with the client and the encrypted content as input, examining the request at the content provider to verify that the client has received the encrypted content, forwarding an encrypted content key from the content provider to the client in response to successful verification, wherein the encrypted content is generated by the content provided based on the symmetric key, and decrypting the encrypted content key at the client to derive the content key.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

Figure 1:
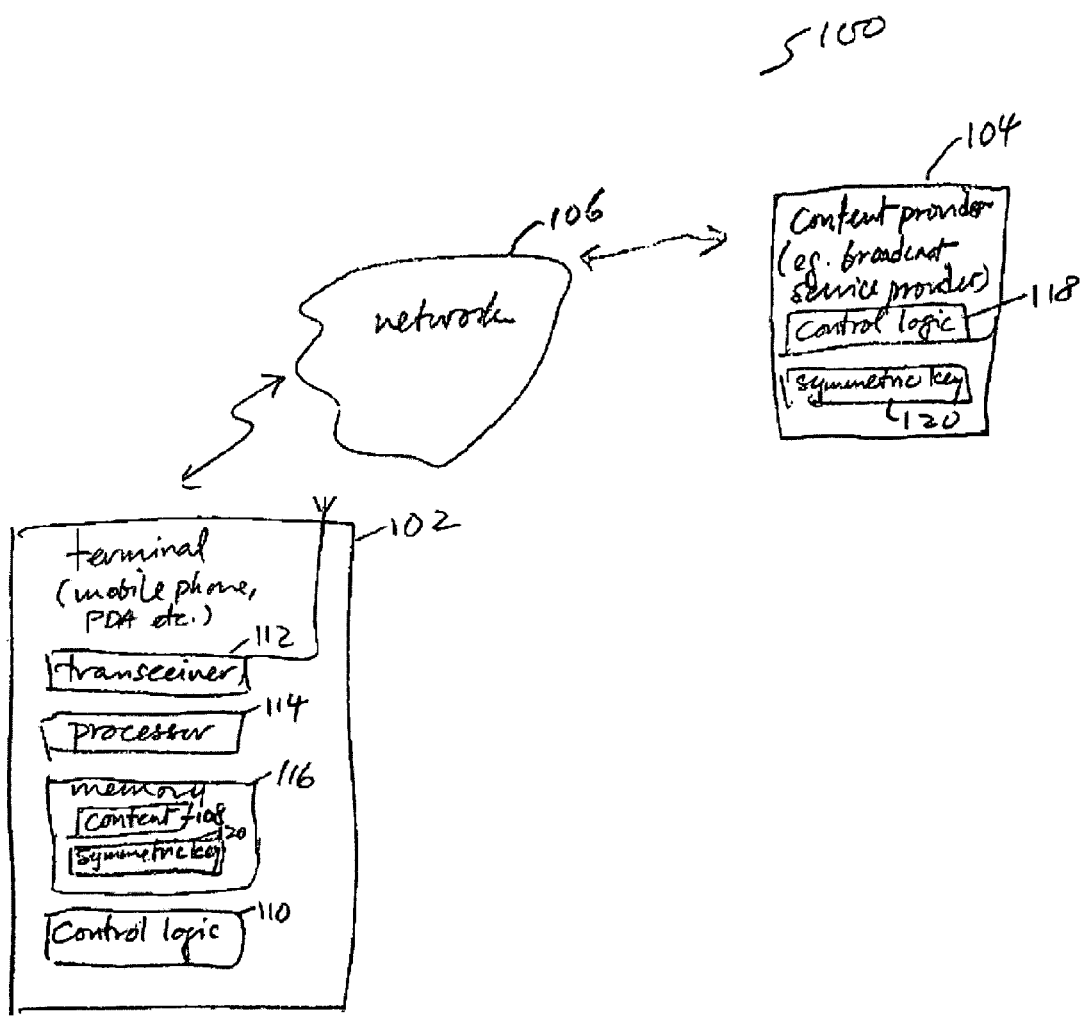
FIG. 1 is a simplified schematic block diagram illustrating a system configuration where an authentication method can be deployed according to the present disclosure.

FIG. 1 illustrates a system 100 that may be used to practice the authentication and payment method according to the present disclosure. In one embodiment, the system 100 may include a client or terminal 102 and a broadcast service provider 104. The terminal 102 may further include a transceiver 112, a processor 114, a memory 116 and control logic 110. The transceiver 112 may be used to facilitate communications between the terminal 102 and the network 106. The terminal 102 and the broadcast service provider 104 may also communicate via the network 106. In a configuration where the terminal 102 is a mobile phone, the terminal 102 may communicate with the broadcast service provider 104 via a wireless communication network. The processor 114 may be used to control operations of the terminal 102. The memory 116 may be configured to store content 108 distributed by the broadcast service provider 104. The terminal 102 may further include control logic 110 that is configured to perform various functionality as will be further described below. The terminal 102 may include a mobile phone or other types of communication devices that are capable of communicating with the broadcast service provider 104.

The broadcast service provider 104 may also include control logic 118 that is configured to perform various functionality as will be further described below. The broadcast service provider 104 may communicate with the terminal 102 for various purposes. For example, the broadcast service provider 104 may forward certain information to the terminal 102 so as to allow the terminal 102 to derive the content 108. The terminal 102 may then store the content 108 for future consumption by a user. The terminal 102 and the broadcast service provider 104 both have knowledge of a valid authentication symmetric key BK 120. The authentication symmetric key BK 120 is uniquely associated with the terminal 102 and its value is known only to the terminal 102 and the broadcast service provider 104. The authentication symmetric key BK 120 is used to facilitate user access to the content 108 stored on the terminal 102, as will be further described below. It should be understood that the broadcast service provider 104 is shown herein for illustrative purposes and may include any device or entity that is capable of delivering contents to another device or entity.

Figure 2:
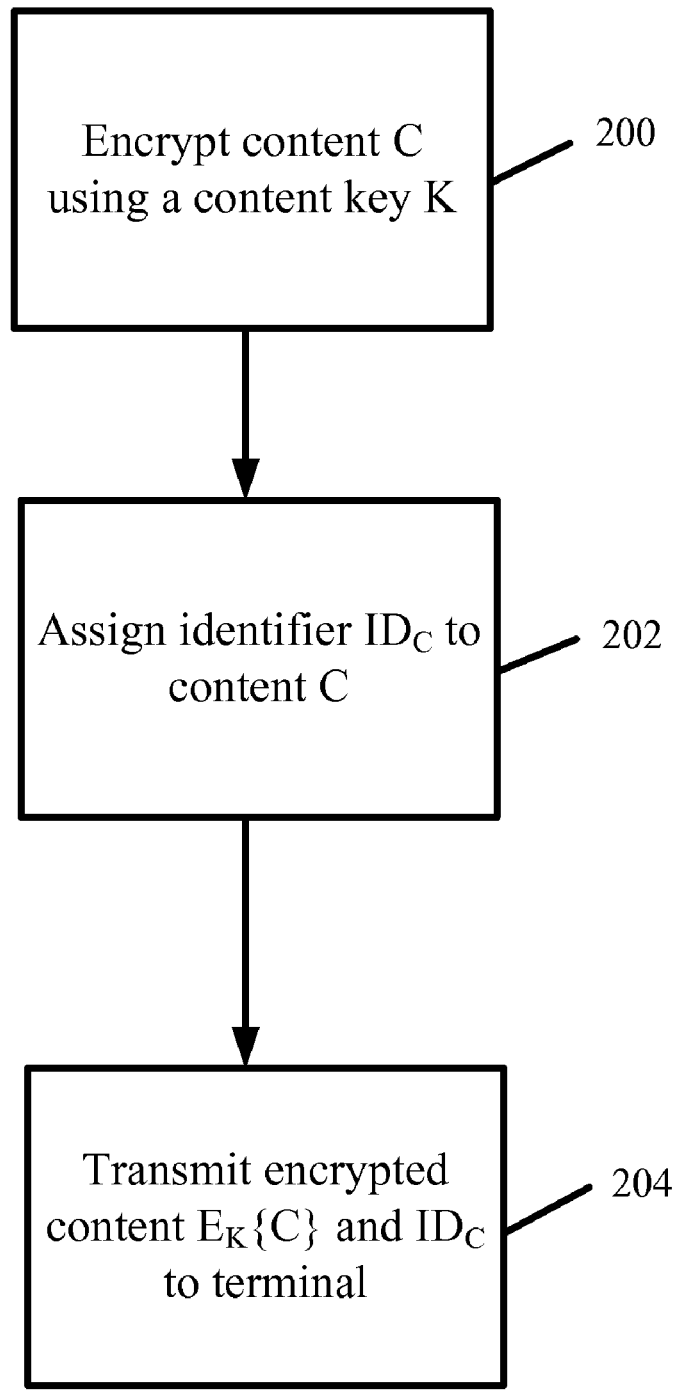
FIG. 2 is a flow diagram illustrating the logic flow of operations of a broadcast service provider with respect to providing content to a terminal according to the present disclosure.

Before the content 108 stored at the terminal 102 can be accessed, the content 108 is first provided by the broadcast service provider 104 to the terminal 102 as follows. Let the content 108 be denoted as "C". FIG. 2 illustrates the logic flow of operations of the broadcast service provider 104 with respect to providing the content 108 to the terminal 102. At block 200, the broadcast service provider 104 encrypts the content 108 using a randomly generated content key denoted as "K". The encrypted content 108 is denoted as "$E_K\{C\}$". At block 202, the broadcast service provider 104 also assigns identifier $ID_C$ to the content 108. $ID_c$ identifies the content C. At block 204, the encrypted content $E_K\{C\}$ and the associated identifier $ID_c$ are then transmitted by the broadcast service provider 104 to the terminal 102. Upon receipt, the terminal 102 stores the encrypted content $E_K\{C\}$ and the associated identifier $ID_c$, for subsequent access. As will be further described below, the content 108 can be derived from the encrypted content $E_K\{C\}$. It should be noted that different content files may be encrypted with different randomly generated content keys. Alternatively, files might be grouped and encrypted with the same key. Based on the disclosure and teachings provided herein, a person of ordinary skill in the art will appreciate how to encrypt content files according to the present disclosure.

Figure 3:
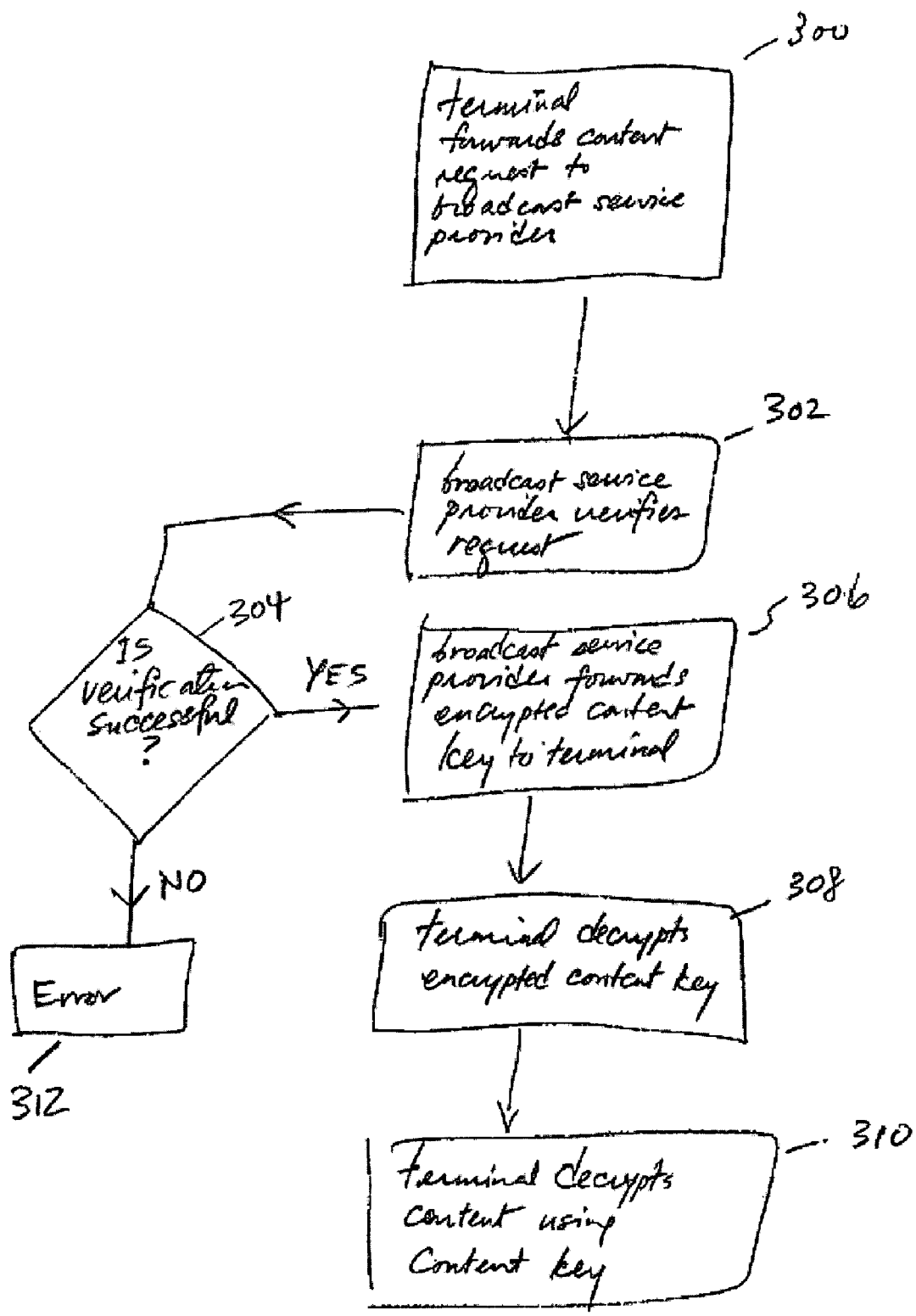
FIG. 3 is a flow diagram illustrating the logic flow for content derivation and access according to the present disclosure.
Figure 4:
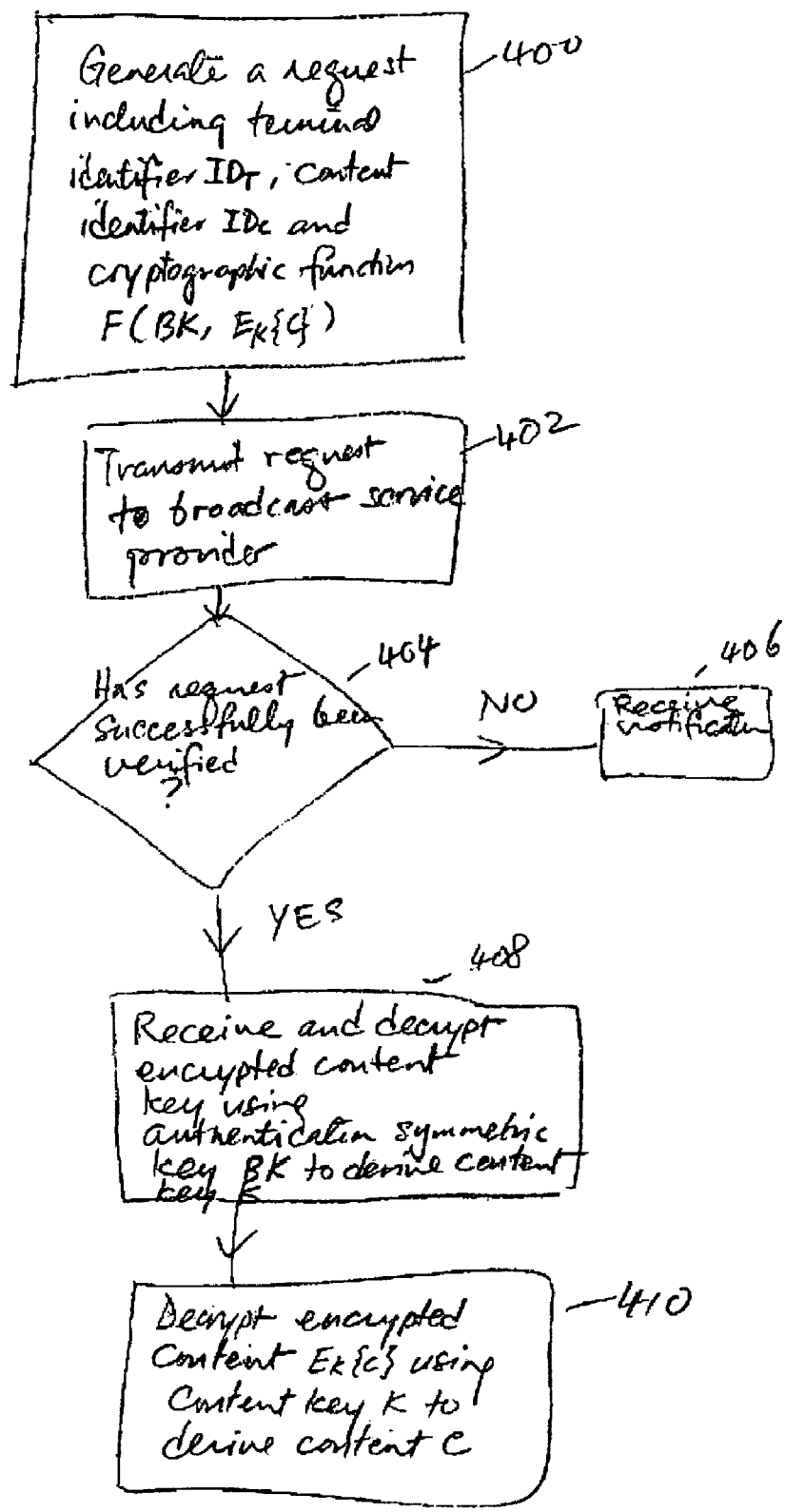
FIG. 4 is a flow diagram illustrating the logic flow of operations performed by the terminal to effect content derivation and access according to the present disclosure.

Assuming that the content 108 has never been accessed or the plaintext version of the content 108 is no longer available on the terminal 102 (which means only the encrypted content $E_K\{C\}$ is accessible), the terminal 102 derives and accesses the content 108 as follows. FIG. 3 illustrates the logic flow of operations between the terminal 102 and the broadcast service provider 104 to effect content derivation and access. FIG. 4 further illustrates the logic flow of operations performed by the terminal 102 to effect content derivation and access. It should be noted that the operations performed by the terminal 102 and broadcast service provider 104 can be carried out by their respective control logic 110 and 118.

First, at block 300, the terminal 102 identifies itself to the broadcast service provider 104 and requests access to the content 108 by forwarding a request to the broadcast service provider 104. Via the request, the terminal 102 also certifies to the broadcast service provider 104 that the terminal 102 actually has the content 108. The certification is performed to ensure that a user cannot subsequently deny that the content 108 was not successfully downloaded at the terminal 102. Referring to FIG. 4, in order to effect the foregoing certification, at block 400, the terminal 102 generates the request. The request includes a terminal identifier $ID_T$ that identifies the terminal's 102 identity, the content identifier $ID_C$ and a cryptographic function $F(BK, E_K\{C\})$ which accepts the authentication symmetric key BK 120 and the encrypted content $E_K\{C\}$ as inputs. The cryptographic function F can be either a collision-resistant hash function such as SHA-1 or an encryption function $F(K,M) = E_K\{M\}$, where M is an input parameter. At block 402, the terminal 102 transmits the request to the broadcast service provider 104. At block 404, the terminal 102 waits to see if the request has been successfully verified by the broadcast service provider 104.

Referring back to FIG. 3, at block 302, upon receiving the request from the terminal 102, the broadcast service provider 104 verifies the information that was received and logs any appropriate information. By examining the information contained in the request including the terminal's identifier $ID_T$, the content identifier $ID_C$ and the cryptographic function $F(BK, E_K\{C\})$, the broadcast service provider 104 is able to determine that the terminal 102 correctly received the previously forwarded encrypted content $E_K\{C\}$. At block 304, the broadcast service provider 104 determines if the verification is successful. At block 312, if the verification is not successful, then the broadcast service provider 104 invokes an error routine. The error routine may include, for example, forwarding an error message or notification to the terminal 102. Referring back to FIG. 4, at block 406, when the terminal 102 receives the error message or notification, it takes appropriate corrective action, if any.

At block 306, upon successful verification, the broadcast service provider 104 forwards the encrypted content key to the terminal 102. The encrypted content key is denoted as "$E_{BK}\{K\}$". As noted above the content key K was previously used by the broadcast service provider 104 to encrypt the content 108 before its delivery to the terminal 102. The content key K can be encrypted in a number of ways. For example, the content key K can be encrypted using the terminal's authentication symmetric key BK 120, which is also known to the broadcast service provider 104.

At block 308, upon receiving the encrypted content key $E_{BK}\{K\}$, the terminal 102 can first perform the appropriate decryption to derive the content key K. More specifically, at block 408, the terminal 102 receives and decrypts the encrypted content key $E_{BK}\{K\}$, since the terminal 102 is aware of the authentication symmetric key BK 120. In the event that the terminal 102 does not receive the encrypted content key $E_{BK}\{K\}$ within a predetermined period of time, the terminal 102 may retransmit its request to the broadcast service provider 104 to re-initiate contact with the broadcast service provider 104.

At block 310, the terminal 102 may then derive the content 108. More specifically, at block 410, upon deriving the content key K, the terminal 102 may then use the content key K to further decrypt the encrypted content $E_K\{C\}$ to obtain the content 108. The content 108 may then be stored by the terminal 102 and provided subsequently to the user in an appropriate manner. For example, the terminal 102 may provide the content 108 to the user subject to certain access conditions and/or restrictions. Such access conditions and/or restrictions may be provided by the broadcast service provider 104 and stored on the terminal 102 in a number of ways. For example, the access conditions and/or restrictions may be forwarded by the broadcast service provider 104 to the terminal 102 via independent communications; alternatively, the access conditions and/or restrictions may be included as part of the encrypted content $E_K\{C\}$ which can then be decrypted as described above. In one instance, the content 108 may include audio/video data representing a movie. According to applicable access conditions and/or restrictions, the terminal 102 may allow the user to view the movie only once or during a predetermined time period. In another instance, the content 108 may include a game. According to applicable access conditions and/or restrictions, the terminal 102 may allow the user to have access to the game on a permanent or limited basis. Based on the disclosure and teachings provided herein, a person of ordinary skill in the art will appreciate how to implement the appropriate access conditions and/or restrictions in accordance with the present disclosure.

In addition, it should be understood that the terminal 102 may further include payment control logic that is configured to bill or charge content access based on the applicable access conditions and/or restrictions. For example, if the content 108 includes a movie, the user may be charged for consumption of the movie on a pay-per-view basis. Based on the disclosure and teachings provided herein, a person of ordinary skill in the art will appreciate how to implement the appropriate payment control logic in accordance with the present disclosure.

Based on the disclosure and teachings provided herein, it will be appreciated by a person of ordinary skill in the art that the method as described above allows the terminal 102 to establish authenticity with the broadcast service provider 104 without the involvement of a trusted third party. In other words, a third party is not needed as an intermediary to confirm the authenticity of one party to another.

The method as described above according to the present disclosure can be deployed in various applications. For example, the method can be deployed for use amongst communication devices or entities including mobile devices, such as, mobile phones or personal digital assistants (PDAs). Based on the disclosure and teachings provided herein, a person of ordinary skill in the art will appreciate how to deploy the method in other applications according to the present disclosure.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the embodiments disclosed herein may be embodied directly in hardware, in a software module executable by a processor, or in a combination of both, in the form of control logic, programming instructions, or other directions. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit of scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more". All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for".

What is claimed is:

1. A mobile phone comprising:
   a symmetric key;
   a processor; and
   control logic executable by the processor and configured to:
     receive non-requested encrypted content from a content provider via a broadcast transmission, wherein the encrypted content is received from the content provider using spare broadcast capacity;
     send a request to the content provider to access the previously received encrypted content, wherein the request includes a terminal identifier and a result of a cryptographic function having the symmetric key and the encrypted content as inputs, the terminal identifier allowing the content provider to identify the symmetric key associated with the mobile phone;
     receive a content key secured by the symmetric key from the content provider if the content provider successfully verifies based on the request that the encrypted content has been correctly received by the mobile phone, the content key secured by the symmetric key being an encrypted content key;
     decrypt the encrypted content key using the symmetric key; and
     decrypt the encrypted content using the content key.

2. The mobile phone of claim 1 wherein the control logic is further configured to store one or more access conditions and allow a user to access the decrypted content in accordance with the one or more access conditions.

3. The mobile phone of claim 2 wherein the control logic is further configured to include payment control logic configured to charge the user for access to the decrypted content.

4. A method operational in a content provider for securely broadcasting content, the method comprising:
   encrypting content using a content key to generate encrypted content;
   broadcasting the encrypted content to at least one client without receiving a request for the encrypted content from the client, wherein the encrypted content is broadcast to the client using spare broadcast capacity;
   receiving a request from the client to access the previously broadcast encrypted content, the request including a terminal identifier and a result of a cryptographic function having a symmetric key associated with the client and the entire encrypted content as inputs, the terminal identifier allowing the content provider to identify the symmetric key associated with the client;
   examining the request to verify that the client has correctly received the encrypted content; and
   forwarding a content key secured by the symmetric key from the content provider to the client in response to successful verification of the request.

5. The method of claim 4 further comprising:
   collecting payment from the client for accessing the content.

6. The method of claim 4 further comprising:
   sending one or more access conditions for the content to the client.

7. The method of claim 4, wherein the encrypted content is forwarded from a broadcast service provider that sends the encrypted content as a broadcast.

8. The method of claim 7, wherein the broadcast encrypted content is capable of being received by a plurality of clients.

9. The method of claim 4, further comprising:
   avoiding the involvement of a trusted third party in examining the request to verify that the client has correctly received the encrypted content.

10. The method of claim 4, further comprising:
    broadcasting the encrypted content to a plurality of clients, wherein each of the plurality of clients can independently request access to the encrypted content using another symmetric key uniquely known to each of the plurality of clients and the content provider.

11. A method operational in a mobile device, comprising:
    receiving non-requested encrypted content from a content provider at the mobile device via a broadcast transmission, wherein the encrypted content is received from the content provider using spare broadcast capacity;
    sending a request to the content provider to access the previously received encrypted content, the request including a terminal identifier and a result of a cryptographic function having a symmetric key and the encrypted content as inputs, the terminal identifier allowing the content provider to identify the symmetric key associated with the mobile device;
    receiving a content key secured by the symmetric key from the content provider if the content provider successfully verifies based on the request that the encrypted content has been correctly received by the mobile device, the content key secured by the symmetric key being an encrypted content key;
    decrypting the encrypted content key using the symmetric key; and
    decrypting the encrypted content using the content key.

12. The method of claim 11 further comprising:
    storing one or more access conditions associated with the content; and
    allowing a user to access the decrypted content in accordance with the one or more access conditions.

13. The method of claim 11, further comprising:
sending payment to the content provider for access to the decrypted content.

14. The method of claim 11 wherein the cryptographic function includes a collision-resistant hash function or an encryption function.

15. The method of claim 11, wherein the broadcast encrypted content is capable of being received by a plurality of mobile devices.

16. The method of claim 11, further comprising:
avoiding the involvement of a trusted third party in successfully verifying based on the request that the encrypted content has been correctly received by the mobile device.

17. The method of claim 11, further comprising:
receiving the encrypted content at the mobile device via a broadcast transmission capable of being received by a plurality of mobile devices that can each independently request access to the encrypted content using another symmetric key uniquely known to each of the plurality of mobile devices and the content provider.

18. A mobile device, comprising:
means for receiving non-requested encrypted content from a content provider at the mobile device via a broadcast transmission, wherein the encrypted content is received from the content provider using spare broadcast capacity;
means for sending a request to the content provider to access the previously received encrypted content, the request including a terminal identifier and a result of a cryptographic function having a symmetric key and the encrypted content as inputs, the terminal identifier allowing the content provider to identify the symmetric key associated with the mobile device;
means for receiving a content key secured by the symmetric key from the content provider if the content provider successfully verifies based on the request that the encrypted content has been correctly received by the mobile device, the content key secured by the symmetric key being an encrypted content key;
means for decrypting the encrypted content key using the symmetric key; and
means for decrypting the encrypted content using the content key.

19. The mobile device of claim 18, further comprising:
means for collecting payment for access to the decrypted content.

20. A computer processor readable medium comprising instructions operational in a mobile device, which when executed by one or more processors causes the processor to:
receive non-requested encrypted content from a content provider at the mobile device via a broadcast transmission, wherein the encrypted content is received from the content provider using spare broadcast capacity;
send a request to the content provider to access the previously received encrypted content, the request including a terminal identifier and a result of a cryptographic function having a symmetric key and the encrypted content as inputs, the terminal identifier allowing the content provider to identify the symmetric key associated with the mobile device;
receive a content key secured by the symmetric key from the content provider if the content provider successfully verifies based on the request that the encrypted content has been correctly received by the mobile device, the content key secured by the symmetric key being an encrypted content key;
decrypt the encrypted content key using the symmetric key; and
decrypt the encrypted content using the content key.

21. A content provider comprising:
a symmetric key associated with a client;
a control logic configured to:
encrypt content using a content key to generate encrypted content;
broadcast the encrypted content to at least one client without a request being received from the client for the encrypted content, wherein the encrypted content is broadcast to the client using spare broadcast capacity;
receive a request from the client to access the previously broadcast encrypted content, the request including a terminal identifier and a result of a cryptographic function having the symmetric key and the encrypted content as inputs, the terminal identifier allowing the content provider to identify the symmetric key associated with the client;
examine the request to verify that the client has correctly received the encrypted content; and
forward a content key secured by the symmetric key from the content provider to the client in response to successful verification of the request.

22. The content provider of claim 21, wherein the control logic is further configured to:
collect payment from the client for accessing the content.

23. The content provider of claim 21, wherein the control logic is further configured to:
send one or more access conditions for the content to the client.

24. A content provider, comprising:
means for encrypting content using a content key to generate encrypted content;
means for broadcasting the encrypted content to at least one client without a request being received from the client for the encrypted content, wherein the encrypted content is broadcast to the client using spare broadcast capacity;
means for receiving a request from the client to access the previously broadcast encrypted content, the request including a terminal identifier and a result of a cryptographic function having a symmetric key associated with the client and the encrypted content as inputs, the terminal identifier allowing the content provider to identify the symmetric key associated with the client;
means for examining the request to verify that the client has correctly received the encrypted content; and
means for forwarding a content key secured by the symmetric key from the content provider to the client in response to successful verification of the request.

25. The content provider of claim 24, further comprising:
means for collecting payment from the client for accessing the content.

26. The content provider of claim 24, further comprising:
means for sending one or more access conditions for the content to the client.

27. A computer processor readable medium comprising instructions operational in a content provider, which when executed by one or more processors causes the processor to:
encrypt content using a content key to generate encrypted content;
broadcast the encrypted content to at least one client without a request being received from the client for the encrypted content, wherein the encrypted content is broadcast to the client using spare broadcast capacity;

receive a request from the client to access the previously broadcast encrypted content, the request including a terminal identifier and a result of a cryptographic function having a symmetric key associated with the client and the encrypted content as inputs, the terminal identifier allowing the content provider to identify the symmetric key associated with the client;

examine the request to verify that the client has correctly received the encrypted content; and forward a content key secured by the symmetric key from the content provider to the client in response to successful verification of the request.

* * * * *